United States Patent [19]

Meurer

[11] 4,448,065
[45] May 15, 1984

[54] METHOD AND APPARATUS FOR PNEUMATICALLY MEASURING THE VOLUME OF COMBUSTION CHAMBER SPACES IN CYLINDER HEADS AND THE LIKE

[75] Inventor: Karl-Heinz Meurer, Leinfelden-Echterdingen, Fed. Rep. of Germany

[73] Assignee: J. W. Froehlich Machinenfabrik GmbH, Leinfelden-Echterdingen, Fed. Rep. of Germany

[21] Appl. No.: 395,682

[22] Filed: Jul. 6, 1982

[30] Foreign Application Priority Data

Jul. 30, 1981 [DE] Fed. Rep. of Germany ....... 3130151
Nov. 12, 1981 [DE] Fed. Rep. of Germany ....... 3144941

[51] Int. Cl.³ .......................................... G01M 15/00
[52] U.S. Cl. ...................................... 73/119 R; 73/149
[58] Field of Search ..................... 73/149, 37.5, 49.7, 73/119 R

[56] References Cited

U.S. PATENT DOCUMENTS 3,060,735 10/1962 Baker ................................... 73/149
3,113,448 12/1963 Hardway, Jr. et al. .......... 73/149 X Primary Examiner—Jerry W. Myracle
Attorney, Agent, or Firm—Barnes & Thornburg

[57] ABSTRACT

A process and apparatus is provided for measuring the volume of workpiece spaces, especially combustion chamber spaces in cylinder heads for internal combustion engines. Pressurized air is supplied to the workpiece space and the pressure compared with the pressure in a similarly supplied known control volume. To compensate for temperature differences in respective workpieces being tested, a second temperature correcting pressurized air circuit is provided which includes a test chamber space in a part attachable directly to the workpiece surface. This test chamber part thus experiences the workpiece temperature and a temperature compensating signal is generated and processed to correct the volume indicating signal.

15 Claims, 3 Drawing Figures

METHOD AND APPARATUS FOR PNEUMATICALLY MEASURING THE VOLUME OF COMBUSTION CHAMBER SPACES IN CYLINDER HEADS AND THE LIKE

BACKGROUND AND SUMMARY OF THE INVENTION

The invention relates to a method and apparatus for pneumatically measuring the volume of a space or spaces in a workpiece, in particular the combustion chamber spaces of a cylinder head for an internal combustion engine. More specifically, the invention relates to improvements in arrangements of the type where the measuring apparatus measures the pressure change in the volume to be measured and by this means the volume is determined.

In practice the volumes of spaces of workpieces need to be accurately measured. This is especially so if the spaces are formed, not by machining operations, but rather by casting of the workpiece. For example, cylinder heads for internal combustion engines that have combustion spaces formed therein by means of casting manufacturing methods and which have in addition relatively irregular shaped combustion spaces present particularly difficult to measure combustion space volumes. On the other hand, however, the volume of the combustion chamber spaces in the cylinder head have a large influence on the quality of combustion and therewith the power and the fuel consumption of the engine. In order to manufacture fuel efficient motor vehicles it is in the interest of the manufacturer to be able to exactly measure the volumes of the combustion spaces in the cylinder head so that he can then maintain the closest possible tolerance on the dimensions of these combustion spaces.

It has been contemplated to measure the volumes of combustion chambers of cylinder heads by means of sealing up the valve seats and bores for the sparkplugs and then after wards filling the spaces with a pipette supplying a fluid, such as oil, and then monitoring the volume of oil required to fill such spaces. This procedure is time consuming and also inexact because it depends upon the skill and carefulness of the person carrying out the tests and how exactly he monitors the filling of the combustion spaces with the measuring fluid. Therefore, this procedure is only practically usable for prototypes or testing of single parts.

It has also been contemplated to use a procedure with pneumatic measurement of the volumes of combustion chamber spaces of the cylinder heads, which procedure can also be used with prototypes or testing of single parts. In this procedure a two-chamber differential pressure transmitter is filled with pressurized air, whereby both chambers are separated from one another. Thereafter, one chamber is connected with a sealed combustion chamber space and the other chamber with a predetermined comparison volume of predetermined size. The differential pressure transmitter then gives a signal which corresponds to the differences between the volumes of the combustion chamber spaces and the predetermined control or comparison volume. This procedure is relatively highly accurate, however, it is not practical for 100% testing of many cylinder heads, particularly, such as would be required on an assembly line, because the measured result is dependent upon the temperature of the cylinder head being measured, and this temperature can vary from one cylinder head to another. This variance in cylinder head temperatures can result from the variances in prior machining or casting operation and the variance in time lapse from a given prior manufacturing operation and the combustion space measurement.

The invention is based upon the problem of developing a procedure using the principal of pneumatic measurement of the known art, usable for 100% testing of all workpieces transported on an assembly line, even if these workpieces exhibit different temperatures. This problem is solved by the invention by providing the help of an additional pneumatic measuring apparatus connected to a test chamber with known volume and which is maintained at the temperature of the workpiece, the system being connected so that the temperature dependent pressure change is automatically compensated for in the measurement results obtained by the measuring apparatus.

The invention is based upon the idea that the test chamber of the additional pneumatic measuring apparatus has the same temperature as the spaces being measured so that temperature related pressure changes can be taken into consideration in the volume measurements These and other objects, features, and advantages of the present invention will become more apparent from the following description when taken in connection with the accompanying drawings which show, for purposes of illustration, several preferred eabodiments in accordance with the present invention.

DETAILED DESCRIPTION OF THE DRAWINGS

Figure 1:
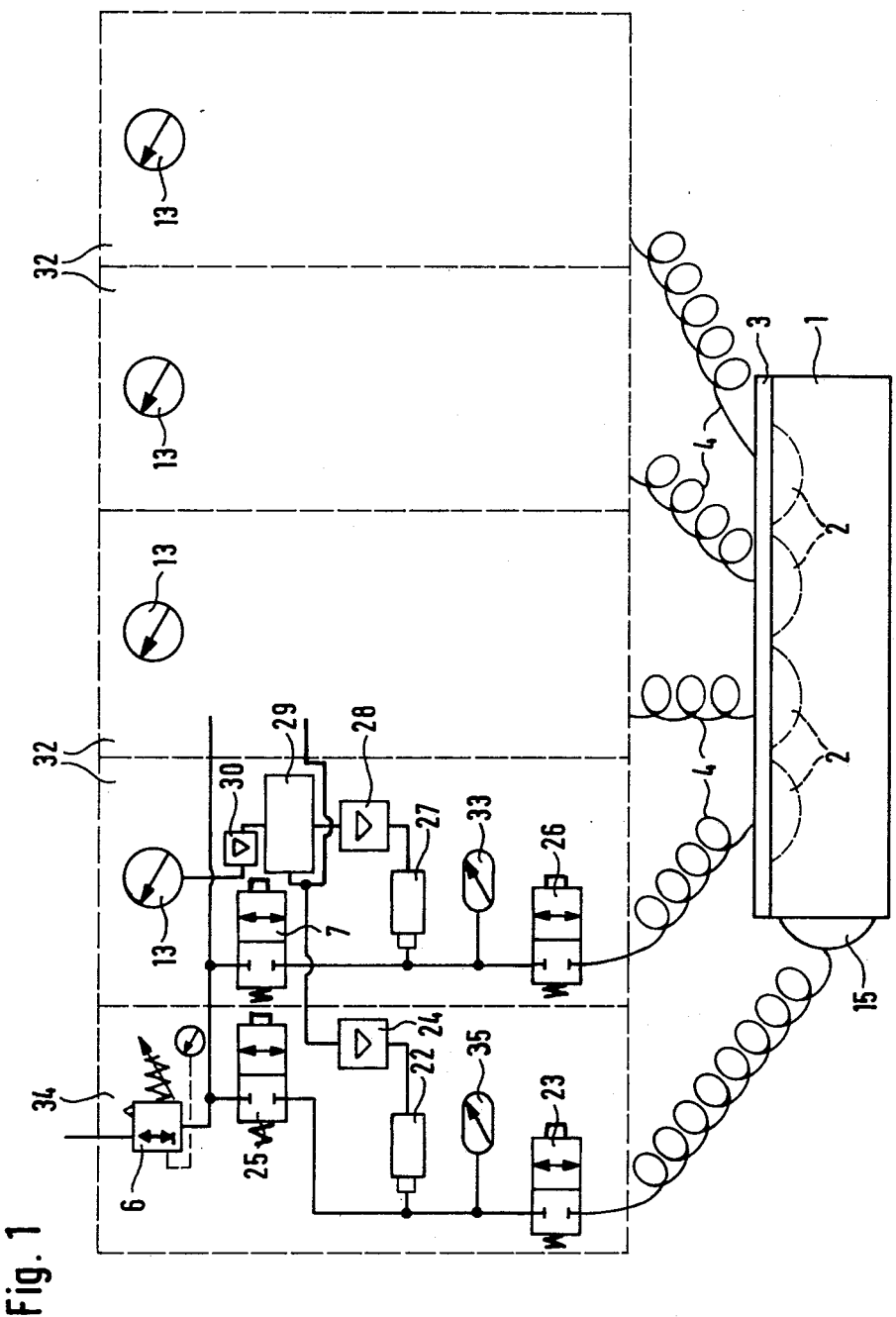
FIG. 1 schematically illustrates a first embodiment of the invention which utilizes an absolute pressure responsive measuring arrangement with several measuring devices to determine the space volumes in a workpiece and with an additional pneumatic measuring arrangement for compensation of the temperature influence of the workpiece.

In FIG. 1 a cylinder head 1 is schematically depicted as it moves through a volume measuring station by way of a conveyor and which exhibits combustion chamber spaces 2, outlined in dotted lines. The combustion spaces 2 of the cylinder head are closed off by a sealing plate 3. This sealing plate 3 holds plug-like sealing elements for the valve seat openings in the combustion spaces 2. Additionally, the spark plug bores or the like are closed with separate sealing elements. Air pressure supply lines are connected to the plate 3, each leading from the measuring device 32 to the respective combustion space 2. The measuring devices 32 in FIG. 1 are identically constructed and only one is being illustrated and described in detail.

Since one skilled in the art should readily be able to make and practice the invention without further details of the conveyor for the cylinder head 1, the cylinder head and spaces 2 thereof, and the sealing plate 3 and associated sealing elements, such details are not included herein. Further, details would obscure the disclosure of the invention.

The measuring device 32 is supplied with pressurized air by way of pressure regulator 6. Downstream of the pressure regulator 6 a filling valve 7 is arranged in device 32 from which valve a line leads to a chamber 33 which has a predetermined volume. The Chamber 33 is connected to an air pressure line leading to a combustion space 2 by way of valve 26. Moreover, the Chamber 33 is also connected to the input of a pressure transducer 27, the output of which transducer 27 is connected with the input of a differential amplifier 29 by way of amplifier 28. The output of differential amplifier 29 is connected to a display device 13 by way of a further amplifier 30. Preferably pressure transducer 27 is constructed so as to have an electrical output signal which is simple to further process.

The second input of the differential amplifier 29 is connected by way of an amplifier 24 to the output of a pressure transducer 22 of an additional pneumatic measuring device 34, which device 34 operates under the same principles as the measuring device 32. Measuring device 34 is also supplied with pressurized air by way of pressure regulator 6. A filling valve 25 is arranged in device 34 downstream of pressure regulator 6, from which valve 25 a line leads to a pre-determined volume chamber 35. The chamber 35 is connected by means of valve 23 to a test chamber 15, which test chamber 15 is formed in a part attachable with the outer surface of the cylinder head 1. This part with test chamber 15 is preferrably abbutingly connectible to a flat outer surface of the cylinder head and test chamber 15 has a predetermined known control volume. A pressure transducer 22 is connected to the chamber 35 and the test chamber 15 as illustrated.

Before starting the measuring process, the measuring devices 32 and 34 are vented in a manner not further described, so that the chambers 35 and 33 as well as the test chamber 15 and the combustion spaces 2 are at atmospheric pressure. In a first phase of the test procedure, the so-called filling phase, the filling valves 7 and 25 are opened so that chambers 33 and 35 are filled with pressurized air. Thereafter the filling valves 7 and 25 are closed. After a leveling or settling phase the valves 26 and 23 are opened so that the pressurized air in the chambers 33 and 35 is respectively expanded into the combustion spaces 2 and the test chamber 15. After this expansion, the existent pressure in chamber 33, the combustion spaces 2, the chamber 35, and the chamber 15 is monitored by means of the respective pressure transducers 27 and 22.

The pressure transducer 27 is constructed in such a way that the electrical output signal corresponding to the nominal volume of the space 2 will be zero. In the event of deviations from this nominal volume there occurs a different reduced pressure with a corresponding change in output of the signal from the pressure transducer. The signal of the pressure transducer 27 directly corresponds to the volume deviation of space 2 from the predetermined nominal volume and could without further modification be accurately illustrated on the display device if the temperature of the cylinder head were a known temperature especially if it were the ambient temperature. However, in practical use with the cylinder heads on a conveyor in any assembly line, one should have some kind of compensation for the influence of the different cylinder head temperatures before the volume measurements signal is displayed. This compensation is obtained according to the preferred embodiment of FIG. 1 by the additional measuring device 34 in association with the differential amplifier 29 of each of the respective measuring devices 32.

Because the test chamber 15 is attached together with the cylinder head 1, the temperature experienced at the test chamber 15 is the same as at the combustion space 2 so that the measurement at the test chamber 15 can be used for the temperature compensation. After opening the valve 23 to the test chamber 15 and the chamber 35, the resultant reduced pressure will be monitored at the pressure transducer 22, the output signal of transducer 22 being set to zero for a pre-determined temperature, such as the ambient temperature. By every other pressure measurement for the pressure transducer 22, the output signal hereof corresponds to a pressure change which in turn corresponds to temperature deviations in the fixed volume test chamber 15. This signal from transducer 22 is then processed in the differential amplifer 29 along with the signal from the measuring device 32 so that the output signal of the differential amplifier 29 is temperature compensated before it is supplied by way of amplifier 30 to the display device 13. This signal displayed at device 13 is then exclusively dependent upon the respective volume of the combustion space 2 being measured.

Figure 2:
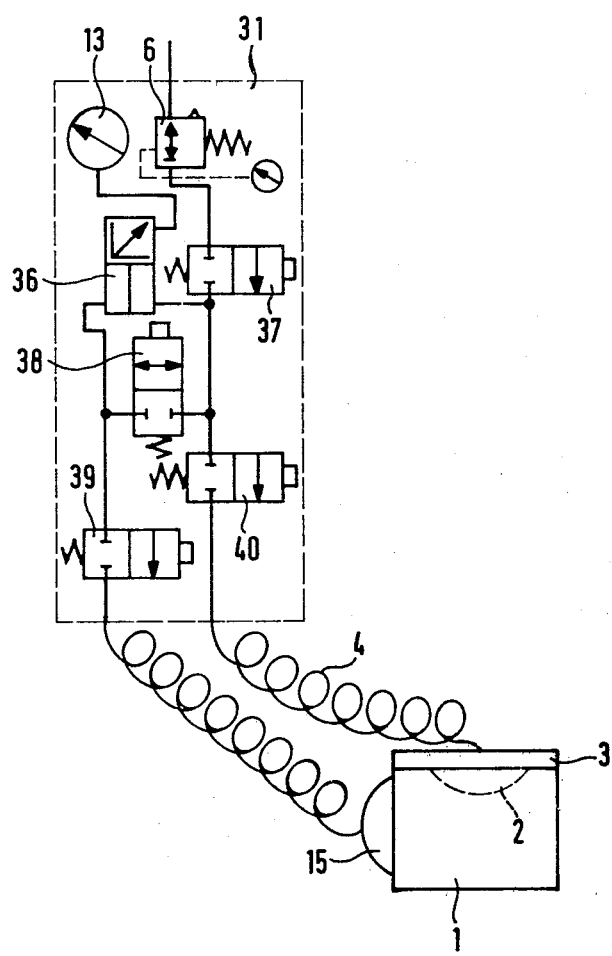
FIG. 2 schematically illustrates a second embodiment of the invention, which utilizes a pressure differential pressure measuring device and procedure.

The measuring arrangement illustrated in FIG. 2 includes a differential pressure circuit and therefore is particularly advantageous for measuring only a single space 2 in a workpiece 1. The space 2 is also in this arrangement closed off by means of a sealing plate 3 which also includes sealing stoppers or the like and is automatically brought into engagement with the workpiece 1. Air pressure line 4 is connected to sealing plate 3 for communicating air pressure to the space 2. With the help of the workpiece 1 and a further construction part there is also a test chamber 15 which is used as a referrene volume for the differential pressure circuit and which advantageously corresponds to the nominal predetermined desired volume of the space 2 in the same manner as described above for the FIG. 1 embodiments.

The measuring device 31 includes a pressure regulator 6 connected with a pressure source as described for the FIG. 1 embodiment. This pressure source is connected to both chambers of a differential pressure amplifier 36 by means of a filling valve 37. Between the two chambers of the differential pressure amplifier 36 a control valve 38 is provided. The one chamber of the differential pressure amplifier 36 is connected with test chamber 15 by way of valve 39 and the other chamber is connected with space 2 being measured by way of valve 40.

Before beginning a measurement, the measuring device 31 is vented by means of further non-illustrated valves to bring all portions to ambient pressure. Thereafter the filling valves 37 and 38 are opened for the filling procedure so that both chambers of the differential pressure transmitter 36 are filled with pressurized air. After the filling procedure the filling valve 37 is closed and then following a balancing phase, valve 38 is also closed. Thereafter the valves 39 and 40 are opened so that the air pressure out of both chambers of the differential pressure transmitter 36 can expand respectively into the test chamber 15 and the space 2. The test chamber 15 serves as a reference volume to the volume of the space 2. An output signal, preferably an electrical signal, of the differential pressure amplifier 36 is fed to the display device 13 after a balancing phase. This output signal corresponds to the volume deviation between the space 2 and the reference volume of test chamber 15. Since the test chamber 15 is connected together with the workpiece 1 it experiences the same temperature as the space 2 so that in both pressure circuits the same temperature change effects are experienced. Therefore, the signal given by the differential pressure transmitter 36 is only dependent upon deviations in the volumes of the spaces 2. An error through different workpiece temperatures is therefore excluded.

If several spaces of a workpiece are to be measured using the embodiment of FIG. 2, then corresponding numbers of measuring devices 31 are provided which then must be provided with the respective test chambers 15, preferably formed in parts connected to flat surfaces of the workpiece.

Figure 3:
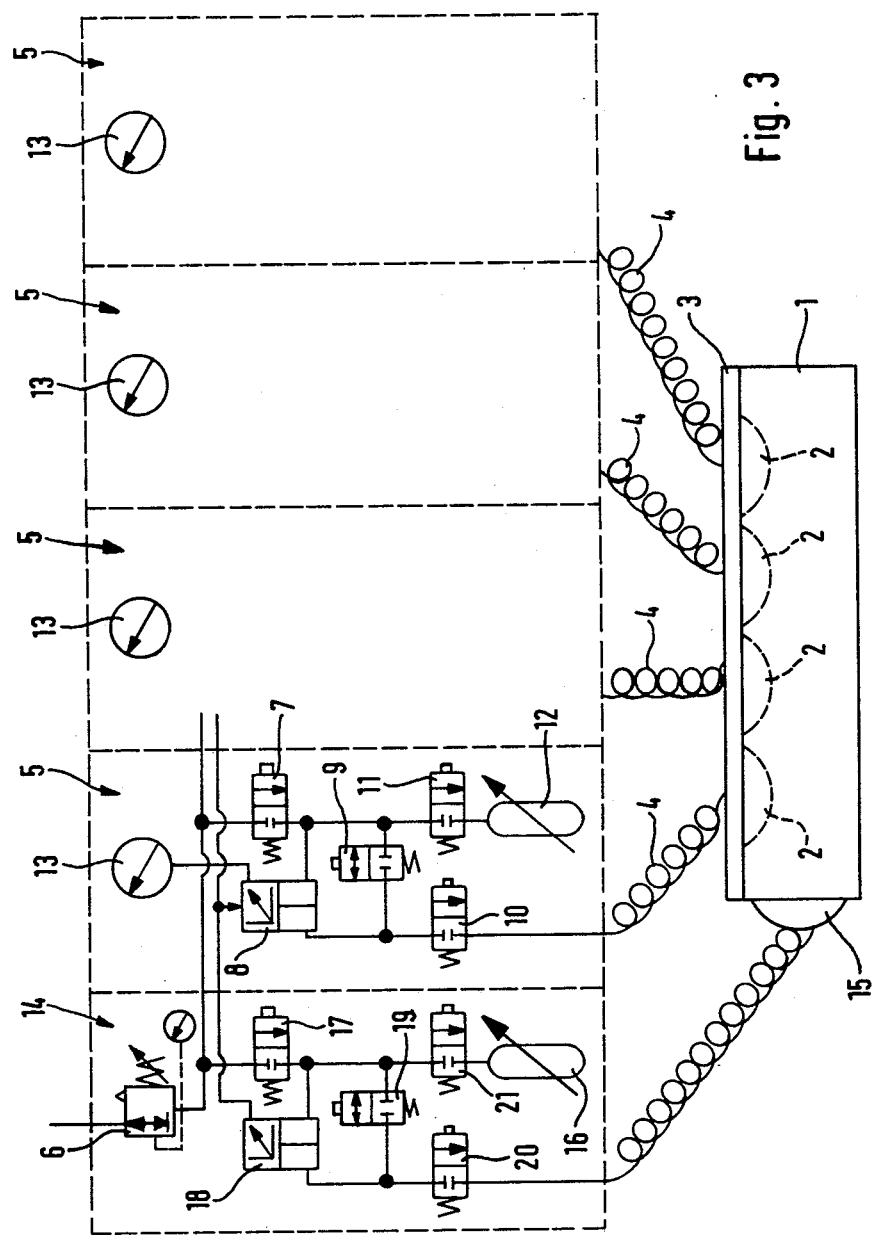
FIG. 3 schematically illustrates a further embodiment of the invention, which has several measuring devices utilizing differential pressure between a comparison volume and the volumes to be measured, and including an additional measuring arrangement for compensation of the temperature influence of the workpiece.

FIG. 3 schematically shows a cylinder head 1 being transported on a conveyor through apparatus for measuring the volumes of the formed combustion spaces 2. The combustion spaces 2 of the cylinder head are covered by the sealing plate 3 by automatic means that are not further illustrated or described. The sealing plate 3 includes sealing elements for stopping up the valve seat openings. Also the spark plug bores are closed with separate sealing elements. Air pressure lines 4 are connected to the plate 3 to communicate the measuring apparatus 5 with the combustion space 2. The measuring devices 5 are all identically built so that only a singly measuring device 5 is illustrated and described herein. The cylinder head 1, combustion spaces 2, and sealing plate 3 are similiar to the FIG. 1 arrangement described above and thus the same reference numerals are used in this FIG. 3.

Measuring device 5 is provided with pressurized air by means of a pressure regulator 6, as in the FIGS. 1 and 2 embodiments. The input of this pressurized air is controlled by a filling valve 7 which is connected to two chambers of a differential pressure amplifier 8. The connection between the two chambers of the differential amplifier 8 can be interrupted by means of valve 9. One chamber of the differential pressure amplifier 8 is connected by means of valve 10 to pressure line 4, which in turn is connected to combustion space 2 of the cylinder head 1. The other chamber of the differential pressure amplifier 8 is connected to a comparison volume 12 by way of valve 11, which comparison volume 12 acts as a kind of predetermined pressure storage.

Before a measuring process, the measuring device 5 is vented to the ambient pressure by means of venting valves (not illustrated) disposed between the valve 10 and the combustion chamber 2 and between the valve 11 and the comparison volume 12 (venting valves not illustrated). During this venting procedure all of the valves 9, 10, and 11 are opened, however, the filling valve 7 is closed. After this venting procedure all of the venting valves and the valves 10 and 11 are closed although valve 9 remains open. Then the filling valve 7 is activated so that the chambers of the differential pressure transmitter 8 are similarly filled with air pressure. Thereafter the filling valve 7 is closed. After a balancing phase the valve 9 is also closed and the valve 10 and 11 are opened. In case there is a difference between the volume of combustion space 2 of the cylinder head 1 and the comparison volume 12, where understandibly the volume of the air lines are taken into account, then there occurs a pressure difference in the chambers of the differential pressure transmitter 8, which pressure difference is given as a signal to the display device 13, which signal will correspond to the volume being measured. With this measuring device 5 the volume of the combustion spaces 2 can be determined with a high degree of accuracy, for example in the range of $+ -0.1$ cm$^3$. This measuring accuracy is obtained, however, only as long as the cylinder head 1 and the comparison volume 12 and the air pressure are at the same temperature level, preferably at room or ambient temperature. This situation is however not always present in moving conveyors of assembly lines because there the cylinder head goes through previous working stations and washing procedures with different results in temperatures. These temperature differences can cause large errors in the measuring results.

In order for the measuring device 5 to be usable on an assembly line with accurate volume measurements of 100% of the cylinder head spaces 2, the differing temperatures causing the possible errors must be compensated for. For this reason there is provided an additional measuring device 14. This measuring device 14 includes a shell shaped element that is connected to an outer flat surface of the cylinder head 1 and which includes a test chamber 15. The test chamber 15 has a predetermined exact volume that corresponds to a comparison volume 16 of the measuring device 14. The measuring device 14 corresponds in its basic construction to the measuring device 5. However, there is no volume difference between the test chamber 15 and the comparison volume 16. When an apparent volume difference is determined by device 14, although in fact no volume difference exists, this apparent volume difference can only happen because the cylinder head 1 has a different temperature than the comparison volume 16, and this apparent volume difference corresponding signal will be monitored and fed as a correction value signal to the measuring device 5.

The measuring device 14 corresponds in its basic construction to the measuring device 5. It includes a differential pressure transmitter 18 with 2 chambers which are connected by way of a filling valve 17 and the pressure regulator 6 for the incoming air pressure. Both chambers of the transmitter 18 are separated by means of valve 19. One of the chambers is connected by valve 20 to the test chamber 15 located at the cylinder head 1, while the other chamber is connected to the comparison volume 16 by way of valve 21. The measuring device 14 uses functions in a manner corresponding to that of the measuring device 5. First the device is ventilated with all of the valves 19, 20, and 21 and any additionally provided venting valves opened, and the filling valve 17 closed, then the valves 20 and 21 are closed so that after opening of the filling valve 17 and valve 19 both chambers of the differential pressure transmitter 18 are filled with air pressure. Thereafter the filling valve 17 is closed. After a balancing phase, the valve 19 is closed and the valves 20 and 21 are opened for a measuring phase. When the differential pressure transmitter 18 determines a pressure difference, its output signal is sent as a correction signal to the differential pressure transmitter 8 of the measuring device 5 so as to correct its corresponding signal. The pressure difference experienced in the chambers of transmitter 18 will correspond to the temperature deviation of the cylinder head as compared to the ambient air, since the volume 16 and test chamber volume 15 have the same predetermined volume. With this compensating arrangement the display device 13 will depict the temperature corrected value. The correction factor is advantageously calibrated empirically using a cylinder head 1 with a combustion space with known volume and with different temperatures. In preferred embodiments, calibration of the differential transmitter 18 and measuring device 14 may be by means of a microprocessor.

The measured result readable on the display device 13 can understandably also work for a control of the automatic further handling of the cylinder head, for example to automatically mark the good parts and the rejected parts and also remove the rejected parts from the assembly line.

The FIGS. 1 to 3 embodiments described above utilize pressure reductions from a nominal value to reflect the temperature difference effects. One can also use pressure increases from a nominal value to reflect workpiece temperature difference effects. For example, one can connect a cylinder space with a volume controlled by a piston to the space being measured so that induced predetermined movements of the piston will define changes in the volume, with pressure changes in the form of pressure increases reflecting volume differences. The temperature compensating arrangement would then include a corresponding cylinder and piston communicating with a predetermined test chamber which is connected to the workpiece so as to be at the workpiece temperature.

While I have shown and described several embodiments in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. Process for measuring the volume of one or more spaces in a workpiece, comprising
    supplying fluid under a predetermined pressure to a first pressure circuit,
    communicating the fluid in said first pressure circuit to a workpiece space to be measured,
    comparing the actual pressure in said workpiece space and first circuit with a predetermined nominal pressure corresponding to a known nominal combustion chamber volume,
    generating a workpiece space volume indicating signal dependent on the difference in said actual and nominal pressures,
    generating a temperature compensating signal dependent on the actual temperature of the workpiece at which the workpiece space is being measured, and
    communicating the temperature compensating signal to means for automatically correcting the workpiece space volume indicating signal to correct erroneous volume indications due to workpiece temperature variation induced pressure changes, wherein said generating a temperature compensating signal includes:
    placing a detachable test chamber part in temperature communicating relationship to the workpiece, said test chamber part defining a test chamber space of predetermined volume,
    supplying fluid under predetermined pressure to a second pressure circuit,
    communicating the fluid in said second pressure circuit to said test chamber space,
    monitoring the actual pressure in said test chamber space and said second circuit, and
    utilizing the monitored actual pressure to generate a corresponding signal which serves as said temperature compensating signal.

2. Process according to claim 1, wherein said fluid is air, wherein said supplying of fluid to said first and second circuits includes communicating both of said circuits to a common source of pressurized air, and wherein said first and second circuits are respective closed circuits separate from one another during volume measuring operations.

3. Process according to claim 2, wherein said temperature compensating signal and said workpiece space volume indicating signal are electrical signals.

4. Process according to claim 2, wherein said supplying of fluid to said first and second circuits include supplying fluid at a predetermined pressure to both transmitter chambers of a differiential pressure transmitter, wherein said test chamber is communicated as a reference volume to one of said transmitter chambers and said workpiece space being measured is communicated with the other of said transmitter chambers, said transmitter generating the temperature compensating signal as a function of the difference in pressures of its respective transmitter chambers.

5. Process according to claim 1, wherein said second circuit is a closable circuit, and wherein said monitoring of the actual signal and generating of the temperature compensating signal includes monitoring the pressure drop in said second circuit and test chamber as compared to a predetermined pressure drop corresponding to a predetermined temperature.

6. Process according to claim 5, wherein said predetermined temperature is the ambient temperature of the room containing the workpiece and measuring equipment.

7. Apparatus for measuring the volume of one or more spaces in a workpiece, comprising
    a first pressure circuit, pressure fluid supplying means for supplying fluid under a predetermined pressure to the first pressure circuit,
    means for communicating the fluid in said first pressure circuit to a workpiece space to be measured,
    comparing means for comparing the actual pressure in said workpiece space and first circuit with a predetermined nominal pressure corresponding to a known nominal combustion chamber volume,
    volume signal generating means for generating a workpiece space volume indicating signal dependent on the difference in said actual and nominal pressure,
    temperature compensation signal generating means for generating a temperature compensating signal dependent on the actual temperature of the workpiece at which the workpiece space is being measured,
    correcting means for automatically correcting the workpiece space volume indicating signal to remove erroneous volume indications due to work piece temperature variation induced pressure changes,
    and means for communicating the temperature compensating signal to said correcting means.

8. Apparatus according to claim 7, wherein the temperature compensating signal generating means includes:
- a detachable test chamber part in temperature communicating relationship to the workpiece, said test chamber part defining a test chamber space in predetermined volume,
- a second pressure circuit means for supplying fluid under predetermined pressure to said second pressure circuit,
- means for communicating the fluid in said second pressure circuit to said test chamber space,
- monitoring means for monitoring the actual pressure in said test chamber space and said second circuit, and
- monitored pressure responsive means for utilizing the monitored actual pressure to generate a corresponding signal which serves as said temperature compensating signal.

9. Apparatus according to claim 8, wherein said fluid is air, wherein said means for supplying fluid to said first and second circuits includes means communicating both of said circuits with a common source of pressurized air, and wherein said first and second circuits are respective closed circuits separate from one another during volume measuring operations.

10. Apparatus according to claim 9, wherein said temperature compensating signal and said workpiece space volume indicating signal are electrical signals.

11. Apparatus according to claim 10, wherein said means for supplying fluid to said first and second circuits includes means for supplying fluid at a predetermined pressure to both transmitter chambers of a differential pressure transmitter, wherein said test chamber is communicated as a reference volume to one of said transmitter chambers and said workpiece space being measured is communicated with the other of said transmitter chambers, said transmitter generating the temperature compensating signal as a function of the difference in pressures of its respective transmitter chambers.

12. Apparatus according to claim 8, wherein said second circuit is a closable circuit, and wherein said monitoring of the actual signal and generating of the corresponding temperature compensating signal includes monitoring the pressure drop in said second circuit and test chamber as compared to a predetermined pressure drop corresponding to a predetermined temperature.

13. Apparatus according to claim 8, wherein said test chamber is formed from a shell or pot shaped part which is configured to abuttingly engage the surface of the workpiece during volume measuring operations.

14. Apparatus according to claim 13, wherein the test chamber space is configured similiarily to the workpiece space being measured.

15. Apparatus according to claim 8, wherein said workpiece is a cylinder head on an internal combustion engine, and wherein said workpiece space being measured is a combustion chamber space formed in said cylinder head.

* * * * *